United States Patent Office 2,773,873
Patented Dec. 11, 1956

2,773,873
HETEROCYCLIC VAT DYESTUFFS

David I. Randall, Easton, Pa., and Wilhelm Schmidt-Nickels, Little York, N. J., assignors to General Aniline & Film Corporation, New York, N. Y., a corporation of Delaware No Drawing. Application December 28, 1954,
Serial No. 478,174

10 Claims. (Cl. 260—272)

This invention relates to the production of heterocyclic vat dyestuffs having the formula

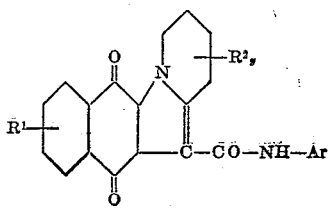

wherein Ar represents an aromatic radical; $R^1$ is selected from the group consisting of hydrogen, nitro, amino and halo; $R^2$ is selected from the group consisting of alkyl and halo; and $y$ has a value of 0 to 3. Dyestuffs having the foregoing generic formula, and a method for producing them by the reaction of a 2,3-dihalo-1,4-naphthoquinone with a pyridine unsubstituted in the 2-position and an N-aromatic acetoacetamide are disclosed in the copending application of Schmidt-Nickels and Lugg, Serial No. 478,171, filed on even date herewith. These compounds constitute a group of improved vat dyestuffs which produce a wide range of shades of good fastness to washing, chlorine and light when dyed and printed in the usual manner.

The instant invention is based upon the discovery that dyestuffs of the aforementioned generic formula may be produced by the reaction of a 1,2-phthaloyl-pyrrocoline-3-carboxylic acid chloride of the formula

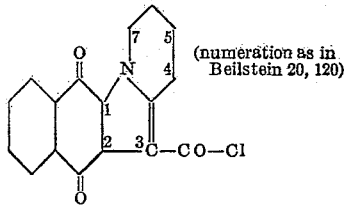

(numeration as in Beilstein 20, 120)

with an aromatic amine of the formula Ar—NH₂ wherein Ar has the value given above.

It will be understood that in carrying out the foregoing reaction, the starting reactants may contain inert substituents which do not interfere with the desired reaction. Thus, the aromatic residue Ar may comprise an aryl radical of the benzene, naphthalene or anthraquinone series or the like which may further contain nuclear substituents, fused rings, or the like, for example nitro, amino, halo such as chloro or bromo, alkyl such as methyl, ethyl, propyl, isopropyl, or butyl or the like, alkoxy such as methoxy, ethoxy, propoxy, isopropoxy, butoxy or the like, phenyl, naphthyl, phenylene, benzoylene, phenylenesulfone or the like. In the acid chloride reactant, $R^1$ may be hydrogen or nitro, and $R^2$ may be alkyl as above defined. Products wherein $R^1$ is amino are obtained by reduction of the corresponding nitro product. Products wherein $R^1$ and/or $R^2$ is halo as above defined are obtained by subsequent halogenation. The 1,2-phthaloyl-pyrrocoline-3-carboxylic acid chloride is produced from the corresponding acid disclosed in the Journal of Organic Chemistry, volume 19, 176, by treatment with thionyl chloride or other well known agents suitable for producing the acid chloride from the free acid. The reaction takes place readily in proportions between about 1 mole of the aromatic amine and a molar quantity of the 1,2-phthaloyl-pyrrocoline-3-carboxylic acid chloride equivalent to the number of free amino groups in the aromatic amine available for reaction or amidation.

As a further feature of this invention, it has been found that the products of the above generic formula wherein Ar is an anthraquinone radical constitute a novel group of compounds having valuable properties as dyestuffs per se or as intermediates for the production of other dyestuffs. These compounds may be defined as those having the formula

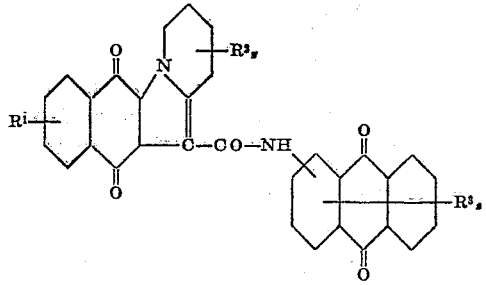

wherein $R^1$, $R^2$, and $y$ have the same values as given above, $R^3$ is selected from the group consisting of alkyl, alkoxy, nitro, amino and halo, as defined above; and $z$ has a value of 0 to 3. These compounds are obtained in the general manner described above by reaction between a 1,2-phthaloyl-pyrrocoline-3-carboxylic acid chloride with an aminoanthraquinone. The former reactant may contain substituents as described above, while the latter anthraquinone reactant may contain alkyl, alkoxy, nitro, amino and/or halo substituents or fused rings or the like. It will be understood that where the anthraquinone reactant contains two non-adjacent amino groups, each of said groups may react with a molecule of the 1,2-phthaloyl-pyrrocoline-3-carboxylic acid chloride as described above in connection with the generic process. Products wherein $R^3$ is halo, amino or imino may also be obtained by subsequent treatment of the product to insert such groups.

Since the reaction involves liberation of HCl, it may be desirable to conduct the reaction in the presence of an acid acceptor such as inorganic alkalis like potassium or sodium hydroxide, or organic bases like pyridine or the like. However, in most cases it is preferable to carry out the reaction in a high boiling organic solvent or diluent at elevated temperatures ranging from about 150 to 220° C. with simultaneous volatilization of the HCl. As suitable reaction media, there may be mentioned nitrobenzene, trichlorobenzene, and other aromatic hydrocarbons and halogenated aromatic hydrocarbons. The reaction product is usually insoluble in the liquid medium employed for the reaction and the precipitate may be readily separated by filtration, washing and the like.

If desired, the vat dyestuffs of this invention may be converted into the alkali metal salts of the polysulfuric acid esters of their leuco forms by the usual known methods such as by treatment with a reducing agent or metal in pyridine-chlorosulfonic acid solution, or by first reducing to the leuco compound and then esterifying in the normal way in an aqueous solution by the action of tertiary amine addition products of sulfur trioxide or in any other suitable manner, followed by treatment with a suitable sodium or potassium compound to produce the desired salt.

The dyestuffs of this invention may be employed for coloring, dyeing or printing film or fibrous material in any form and having a basis of natural or artificial polymeric material such as cotton or other natural cellulosic material, regenerated cellulose such as derived by the viscose or cuprammonium process or by saponification of cellulose esters, or other material capable of being colored by vat dyestuffs in soluble, dispersed or pigment form.

The following examples, in which parts are by weight unless otherwise indicated, are illustrative of preferred embodiments of this invention and are not to be regarded as limitative. Parts are in grams by weight, in cc. by volume.

Example 1

A charge of 60 parts by volume nitrobenzene, 1.8 parts by weight benzidine sulfone of the structure:

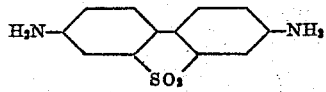

and 4.0 parts by weight 1,2-phthaloyl-pyrrocoline-3-carboxylic acid chloride was stirred at 200–205° C. for 2 hours. The reaction product was filtered off at room temperature, washed with acetone, water and dried. It has the apparent structure:

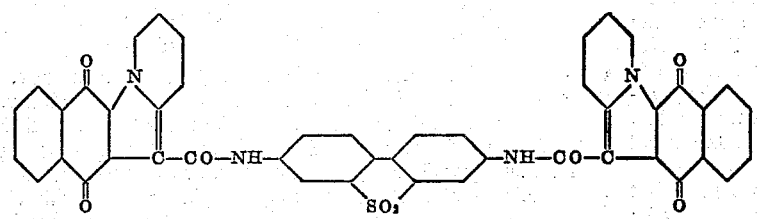

and is identical with the product of Example 3 of the above-mentioned copending application, dyeing cotton from an alkaline hyrosulfite vat reddish brown shades of good fastness to chlorine and light.

Example 2

A charge of 50 parts by volume nitrobenzene, 2.7 parts by weight 1,2-phthaloyl-pyrrocoline-3-carboxylic acid chloride, 2.0 parts by weight 2-aminofluorenone was stirred at 200–205° C. for 2 hours. The reaction product was worked up as described in Example 1. It has the apparent structure:

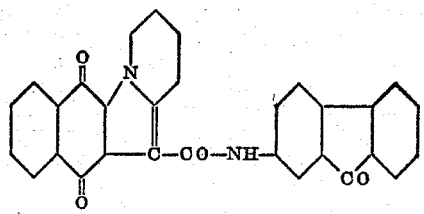

and is identical with the product of Example 1 of said copending application, dyeing cotton violet shades of good fastness to washing, chlorine and light.

Example 3

A charge of 70 parts by volume nitrobenzene, 3.8 parts by weight 1,2-phthaloyl-pyrrocoline-3-carboxylic acid and 2.1 parts by volume thionyl chloride was stirred at 160–170° C. for 1 hour to convert the acid into its chloride. After allowing the temperature to drop to 100° C., 5.1 parts by weight 1-benzoylamino-4-aminoanthraquinone was added. Agitation was then continued at 165–170° C. for 2 hours. The reaction product was filtered off at room temperature, washed with nitrobenzene, acetone and dried. It has the apparent formula:

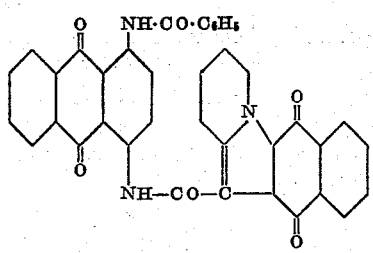

The compound dyes cotton from an alkaline hydrosulfite vat reddish orange shades of good fastness to washing, chlorine and light.

Example 4

A charge of 70 parts by volume nitrobenzene, 9.7 parts by weight 1,2-phthaloyl-pyrrocoline-3-carboxylic acid and 4.7 parts by volume thionyl chloride was stirred at 160–170° C. for 1 hour. After allowing the temperature to drop to 100° C., 70 parts by volume nitrobenzene and 8.6 parts by weight 1-amino-4-chloroanthraquinone were added. The charge was then agitated at 165–170° C. for 2 hours and worked up as described in Example 1. The reaction product is 1-[1,2-phthaloyl-pyrrocoline-3 - carbonyl-amino] - 4 - chloroanthraquinone of the structure:

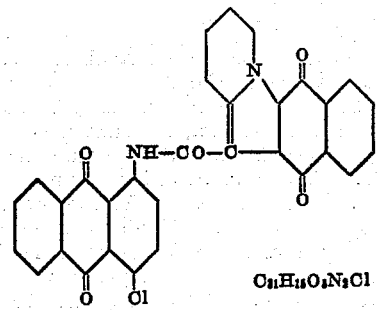

$C_{31}H_{15}O_5N_2Cl$

Found: $N=5.36$, $Cl=7.90\%$.
Theory for $C_{31}H_{15}O_5N_2Cl$: $N=5.28\%$, $Cl=6.69\%$.

The compound gives weak dyeings on cotton and is more important as an intermediate for the synthesis of other vat dyestuffs.

Example 5

A charge of 150 parts by volume nitrobenzene, 18.7 parts by weight 1-[1,2-phthaloyl-pyrrocoline-3-carbonylamino]-4-chloroanthraquinone prepared as described in Example 4, 8.5 parts by weight para-toluolsulfonamide, 6.8 parts by weight potassium carbonate, 0.4 part by weight anhydrous copper acetate and 0.18 part by weight copper powder was stirred at 200–205° C. for 8 hours. The reaction product was filtered off at room temperature, washed with nitrobenzene, alcohol, water and dried. It has the apparent structure:

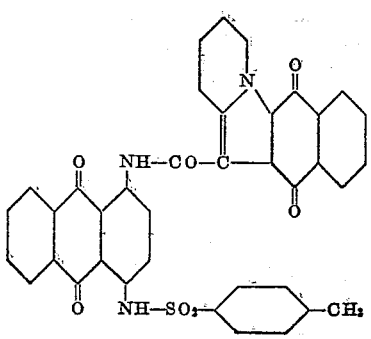

For the saponification of the para-toluolsulfonamide group a charge of 180 parts by volume concentrated sulfuric acid (96%) and 18 parts by weight of the above reaction product was stirred at 50° C. for 1 hour and then poured in water. The saponification product was filtered off, washed neutral with hot water and dried. It is 1-[1,2-phthaloyl-pyrrocoline-3-carbonyl-amino]-4-aminoanthraquinone of the apparent structure:

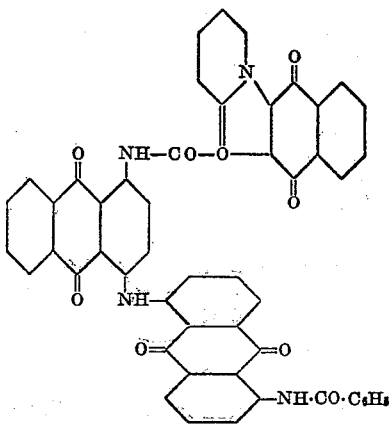

Found: N=8.33%.
Theory for $C_{31}H_{17}O_5N_3$: N=8.22%.

The compound gives weak dyeings on cotton and is more important as an intermediate for the synthesis of other vat dyestuffs.

Example 6

A charge of 35 parts by volume nitrobenzene, 3.8 parts by weight 1-[1,2-phthaloyl-pyrrocoline-3-carbonylamino]-4-chloroanthraquinone, prepared as described in Example 4, 2.4 parts by weight 1-benzoylamino-5-aminoanthraquinone, 0.8 part by weight anhydrous sodium carbonate and 0.4 part by weight copper powder was stirred at 200° C. for 20 hours. The condensation product was filtered off at room temperature, washed with nitrobenzene, alcohol, water and dried. It has the apparent structure:

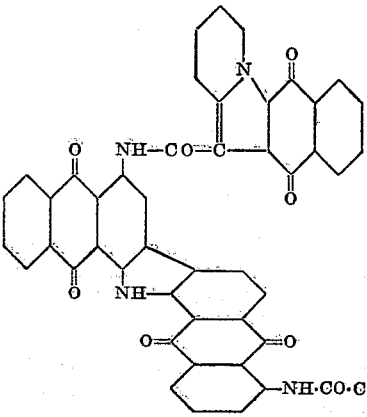

Carbazole ring-closure was carried out as follows: 5 parts by weight of the above product was introduced below 35° C. into 35 parts by volume concentrated sulfuric acid (96%). After addition of 0.2 part by weight hydroquinone the charge was stirred at 35° C. for 1 hour and then poured into a solution of 500 parts by volume water and 2.4 parts by weight sodium bichromate. The mixture was stirred at 70° C. for 1 hour, filtered and the cake washed neutral and dried. The reaction product has the apparent structure:

The compound dyes cotton from an alkaline hydrosulfite vat brown shades of good fastness to light. It will be understood that other well known carbazole ring closing agencies may be employed in the above process.

Example 7

A charge of 40 parts by volume nitrobenzene, 0.9 part by weight dibromanthanthrone of the apparent structure:

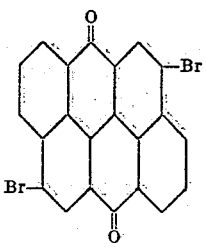

2.0 parts by weight 1-[1,2-phthaloyl-pyrrocoline-3-carbonylamino]-4-aminoanthraquinone, prepared as described in Example 5, 0.7 part by weight anhydrous sodium acetate and 0.3 part by weight copper oxide was stirred at 200–205° C. for 20 hours. The reaction product was filtered off at room temperature, washed with nitrobenzene, alcohol, water until neutral and dried. It has the apparent structure:

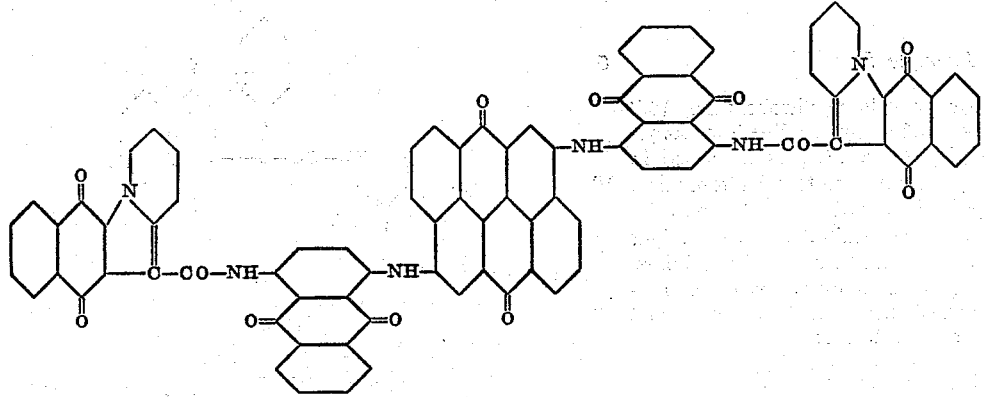

The compound dyes cotton from an alkaline hydrosulfite vat grey shades with a reddish tint.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

What is claimed is:
1. A compound having the formula

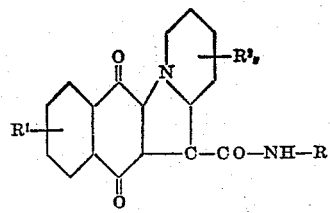

wherein $R^1$ is selected from the group consisting of hydrogen, nitro-, amino and halo; $R^2$ is selected from the group consisting of lower alkyl and halo; R is an anthraquinonyl radical; and $y$ has a value of 0 to 3.

2. In a process for producing a compound as defined in claim 1, the step comprising reacting by heating a 1,2-phthaloyl-pyrrocoline-3-carboxylic acid chloride having the formula

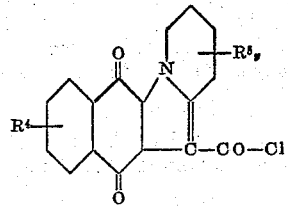

wherein $R^4$ is selected from the group consisting of hydrogen and nitro, $R^5$ is lower alkyl and $y$ has a value of 0 to 3, with an aminoanthraquinone compound.

3. A compound of the formula

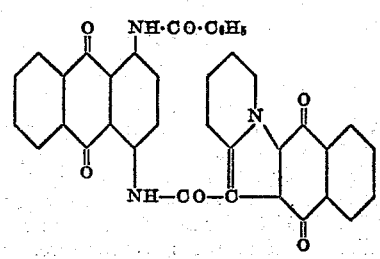

4. A process for producing a compound as defined in claim 3 comprising reacting by heating 1,2-phthaloyl-pyrrocoline-3-carboxylic acid chloride with 1-benzoylamino-4-aminoanthraquinone.

5. A compound of the formula

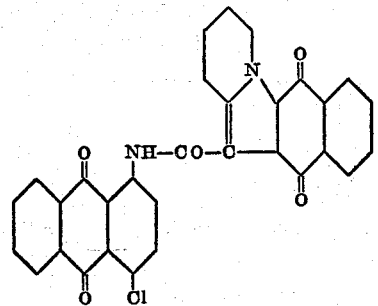

6. A process for producing a compound as defined in claim 5 comprising reacting by heating 1,2-phthaloyl-pyrrocoline-3-carboxylic acid chloride with 1-amino-4-chloroanthaquinone.

7. A compound of the formula

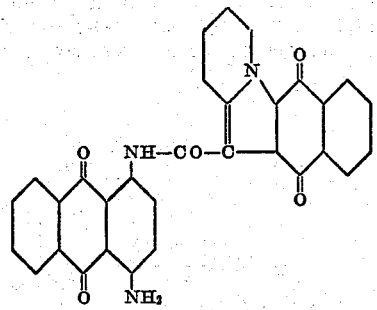

8. A process for producing a compound as defined in claim 7 comprising reacting by heating a compound as defined in claim 5 with paratoluene sulfonamide and then subjecting the intermediate thus formed to saponification.

9. A compound of the formula

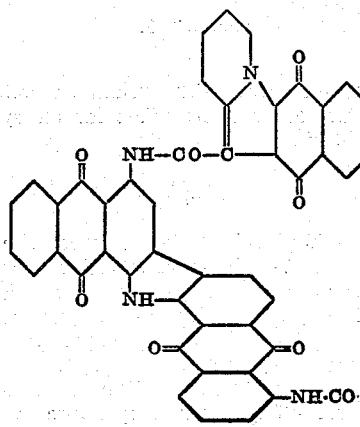

10. A compound of the formula
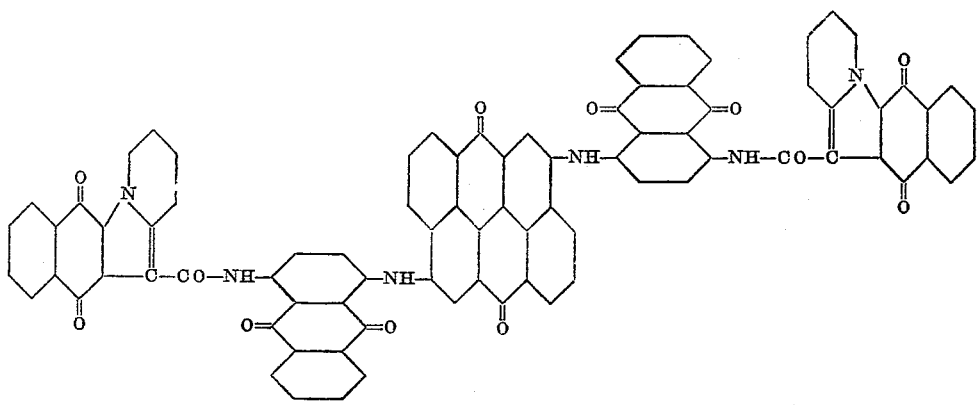
References Cited in the file of this patent
Maxim et al.: Chem. Abstracts, vol. 32, cols. 2938–39 (1938).
Borsche et al.: Chem. Abstracts, vol. 37, col. 2378 (1943).